(12) United States Patent
Fredinburg et al.

(10) Patent No.: US 9,436,180 B1
(45) Date of Patent: Sep. 6, 2016

(54) LOCATION-BASED PRIVACY

(71) Applicant: Google Inc., Mountain View, CA (US)

(72) Inventors: Daniel Fredinburg, Mountain View, CA (US); Brian Kemler, San Francisco, CA (US)

(73) Assignee: Google Inc., Mountain View, CA (US)

( * ) Notice: Subject to any disclaimer, the term of this patent is extended or adjusted under 35 U.S.C. 154(b) by 8 days.

(21) Appl. No.: 14/250,752

(22) Filed: Apr. 11, 2014

(51) Int. Cl.
*G05D 1/00* (2006.01)
*G05D 3/00* (2006.01)
*G06F 7/00* (2006.01)
*G06F 17/00* (2006.01)

(52) U.S. Cl.
CPC ..................................... *G05D 1/00* (2013.01)

(58) Field of Classification Search
CPC combination set(s) only.
See application file for complete search history.

(56) References Cited

U.S. PATENT DOCUMENTS

| | | | |
|---|---|---|---|
| 8,456,294 B2 | 6/2013 | Emigh et al. | |
| 2002/0057217 A1* | 5/2002 | Milnes | G01C 21/28 342/357.57 |
| 2005/0125154 A1* | 6/2005 | Kawasaki | G01D 1/16 701/301 |
| 2007/0008179 A1* | 1/2007 | Hedley | G07B 15/06 340/928 |
| 2009/0268947 A1* | 10/2009 | Schaufler | G06K 9/00805 382/104 |
| 2010/0296705 A1* | 11/2010 | Miksa | G01C 11/02 382/106 |
| 2013/0318214 A1 | 11/2013 | Tebay et al. | |

OTHER PUBLICATIONS

Bill Schilit, Jason Hong, and Marco Gruteser, Wireless Location Privacy Protection, Invisible Computing, Dec. 2003, pp. 135-137.
Franco Zambonelli and Marco Mamei, The Cloak of Invisibility: Challenges and Applications; Prevasive Computing, Dec. 2002, pp. 62-70.

* cited by examiner

*Primary Examiner* — Bhavesh V Amin
(74) *Attorney, Agent, or Firm* — Lerner, David, Littenberg, Krumholz & Mentlik, LLP (57) ABSTRACT

Aspects of the present disclosure relate to anonymizing user identity from nearby vehicles, such as autonomous vehicles, that may be gathering sensor data. In one aspect, one or more computing devices of an autonomous vehicle may receive location information identifying a geographic location. Further, the one or more computing devices may receive sensor data captured by one or more sensors of the vehicle and determine whether any of the sensor data is within a threshold distance from the geographic location. Based on the determination, the one or more computing devices may filter the sensor data that is within the threshold distance and send the filtered sensor data to one or more server computing devices for further processing.

18 Claims, 10 Drawing Sheets

LOCATION-BASED PRIVACY

BACKGROUND

Autonomous vehicles, such as vehicles which do not require a human driver, may be used to aid in the transport of passengers or items from one location to another. An important component of autonomous vehicles is the perception system, which allows the vehicle to perceive and interpret its surroundings using cameras, different types of sensors, and global positioning devices. The perception system executes numerous decisions while an autonomous vehicle is in motion, such as speeding up, slowing down, stopping, turning, etc. Autonomous vehicles may also use the cameras, sensors, and global positioning devices to gather images and sensor data about its surrounding environment, e.g., roads, buildings, sidewalks, etc. These images and sensor data allow the vehicle to safely maneuver itself around obstacles. In addition, this information may be examined in an offline environment in order to improve the vehicle's object detection and maneuvering capabilities.

BRIEF SUMMARY

In one aspect, a method comprises receiving, by one or more computing devices, location information identifying a geographic location. The method further comprises receiving, by the one or more computing devices, sensor data captured by one or more sensors of a vehicle, and determining, by the one or more computing devices, whether any of the sensor data is within a threshold distance from the geographic location. Based on the determination, the method further comprises filtering, by the one or more computing devices, the sensor data that is within the threshold distance, and sending the filtered sensor data to one or more server computing devices for further processing.

In another aspect, a system is provided comprising a memory and one or more computing devices, each of the one or more computing devices having one or more processors, the one or more computing devices being coupled to the memory. The one or more computing devices are configured to receive location information identifying a geographic location, receiving sensor data captured by one or more sensors of a vehicle, and determine whether any of the sensor data is within a threshold distance from the geographic location. The one or more computing devices are further configured to filter the sensor data that is within the threshold distance based on the determination, and send the filtered sensor data to one or more server computing devices for further processing.

In yet another aspect, a method comprises receiving, by one or more computing devices, geographic location data from a client computing device to identify a geographic location, and scrubbing, by the one or more computing devices, the received geographic location data to remove any identification information related to a user of the client computing device. After the identification information related to the user is scrubbed, the method further comprises sending, by the one or more computing devices, instructions to a vehicle to filter any sensor data within a threshold distance from the geographic location, and receiving, by the one or more computing devise, the filtered sensor data.

DETAILED DESCRIPTION

The technology relates to protecting a user's privacy where vehicles may be gathering images or other sensor data near the user's location. For example, a privacy cloak for the user may be implemented using a client computing device that provides location information to one or more server computing devices. These one or more server computing devices, in turn, may send location information to a vehicle collecting sensor data. Before a computer associated with a vehicle stores any information about its environment, the computer may determine whether the vehicle entered an area or boundary covered by the user's cloak while the vehicle's sensors were gathering images and/or sensor data. Based on this determination, the autonomous vehicle may filter, e.g., discard, blur, etc., or otherwise process the acquired information to protect the privacy of a user.

In one aspect, a user may cloak his or her identity using a client computing device, such as a mobile phone, head-mounted computing device, wearable computing device, etc. The user may login to a secure web account, which sends location information to a centralized computing system, such as one or more server computing devices. The one or more server computing devices may scrub or anonymize any information identifying the user. Upon complete removal of any information that may identify the user, the one or more server computing devices may send the scrubbed location information to any autonomous vehicle that may be within some relevant area to the user's location, such as the same city, county, or state.

One or more autonomous vehicles within the relevant area described above may receive the user's scrubbed location information. In that regard, a collecting vehicle, such as an autonomous vehicle, may be able to identify the location of a cloaked user, but not the user's identity. Meanwhile, the autonomous vehicle may be using its cameras and sensors to capture images and sensor data to control the vehicle, detect and avoid objects, navigate, recognize road features, etc. Before storing any of this information, the autonomous vehicle's computing system may determine whether any images or other sensor data was acquired within an area or boundary covered by a privacy cloak based on the user's locations the computing system received from the one or more server computing devices. For instance, the privacy cloak for a user may cover up to a certain predetermined and/or user-defined threshold distance from the location of the user's client computing device, e.g., 4 meter radius or more.

Based on this determination, the vehicle's computing system may filter (e.g., blur) the images, and all other unfiltered images may be stored on the vehicle. After a period of time, the stored information on the autonomous vehicle may be uploaded to or downloaded by the one or more server computing devices.

In another aspect, the filtration of the images acquired within the area covered by the user's privacy cloak referenced above may include blurring, removing, or making completely unidentifiable any potential users in the images.

Figure 1A:
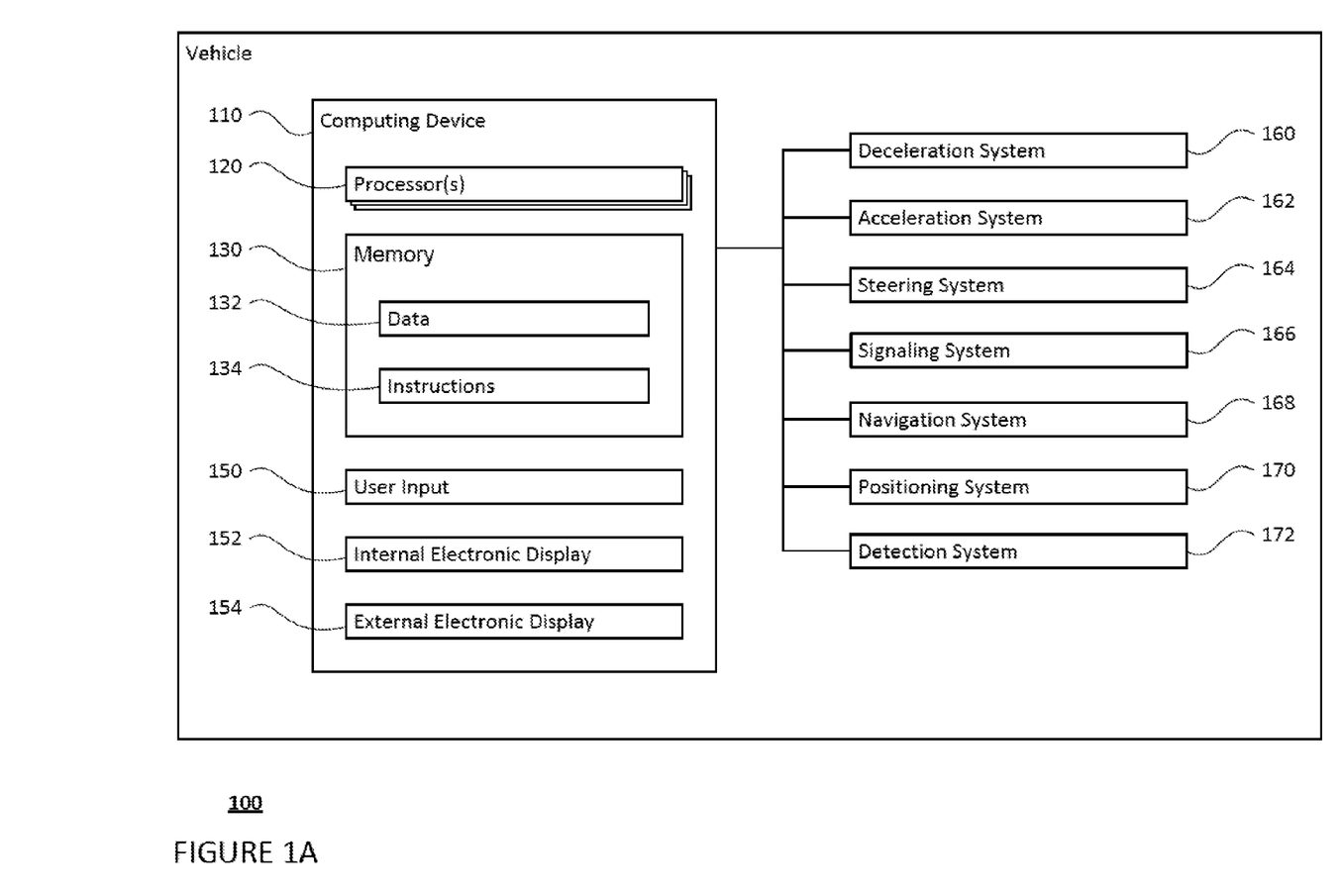
FIG. 1A is a functional diagram of a system in accordance with aspects of the disclosure.

As shown in FIG. 1A, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, boats, airplanes, helicopters, lawnmowers, recreational vehicles, amusement park vehicles, farm equipment, construction equipment, trams, golf carts, trains, and trolleys. The vehicle may have one or more computing devices, such as computing device 110 containing one or more processors 120, memory 130 and other components typically present in general purpose computing devices.

The memory 130 stores information accessible by the one or more processors 120, including data 132 and instructions 134 that may be executed or otherwise used by the processor(s) 120. The memory 130 may be of any type capable of storing information accessible by the processor(s), including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The data 132 may be retrieved, stored or modified by processor(s) 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The one or more processors 120 may be any conventional processors, such as commercially available CPUs. Alternatively, the one or more processors may be a dedicated device such as an ASIC or other hardware-based processor, such as a field programmable gate array (FPGA). Although FIG. 1A functionally illustrates the processor(s), memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing device 110 may have all of the components normally used in connection with a computing device such as the processor and memory described above, as well as a user input 150 (e.g., a mouse, keyboard, touch screen and/or microphone) and various electronic displays (e.g., a monitor having a screen, a small LCD touch-screen or any other electrical device that is operable to display information). In this example, the vehicle includes an internal electronic display 152 as well as an external electronic display 154. In this regard, internal electronic display 152 may be located within a cabin of vehicle 100 and may be used by computing device 110 to provide information to passengers within the vehicle 100. External electronic display 154 may be located eternally or mounted on an external surface of the vehicle 100 and may be used by computing device 110 to provide information to potential passengers or other persons outside of vehicle 100.

In one example, computing device 110 may be an autonomous driving computing system incorporated into vehicle 100. The autonomous driving computing system may capable of communicating with various components of the vehicle. For example, returning to FIG. 1, computing device 110 may be in communication various systems of vehicle 100, such as deceleration system 160, acceleration system 162, steering system 164, signaling system 166, navigation system 168, positioning system 170, and detection system 172 in order to control the movement, speed, direction, etc. of vehicle 100 in accordance with the instructions 134 stored in memory 130. Although these systems are shown as external to computing device 110, in actuality, these systems may also be incorporated into computing device 110, again as an autonomous driving computing system for controlling vehicle 100.

As an example, computing device 110 may interact with deceleration system 160 and acceleration system 162 in order to control the speed of the vehicle. Similarly, steering system 164 may be used by computing device 110 in order to control the direction of vehicle 100. For example, if vehicle 100 configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Navigation system 168 may be used by computing device 110 in order to determine and follow a route to a location. In this regard, the navigation system 168 and/or data 132 may store map information, e.g., highly detailed maps identifying the shape and elevation of roadways, lane lines, intersections, crosswalks, speed limits, traffic signals, buildings, signs, real time traffic information, vegetation, or other such objects and information.

Positioning system 170 may be used by computing device 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with computing device 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The detection system 172 also includes one or more components for detecting objects external to the vehicle such as other vehicles, obstacles in the roadway, traffic signals, signs, trees, etc. For example, the detection system 170 may include lasers, sonar, radar, one or more cameras, or any other detection devices which record data which may be processed by computing device 110. In the case where the vehicle is a small passenger vehicle such as a car, the car may include a laser mounted on the roof or other convenient location.

The computing device 110 may control the direction and speed of the vehicle by controlling various components. By way of example, if the vehicle is operating completely autonomously, computing device 110 may navigate the vehicle to a location using data from the detailed map information and navigation system 168. Computing device 110 may use the positioning system 170 to determine the vehicle's location and detection system 172 to detect and respond to objects when needed to reach the location safely. In order to do so, computing device 110 may cause the vehicle to accelerate (e.g., by increasing fuel or other energy provided to the engine by acceleration system 162), decelerate (e.g., by decreasing the fuel supplied to the engine or by applying brakes by deceleration system 160), change direction (e.g., by turning the front or rear wheels of vehicle 100 by steering system 164), and signal such changes (e.g. by lighting turn signals of signaling system 166).

Figure 1B:
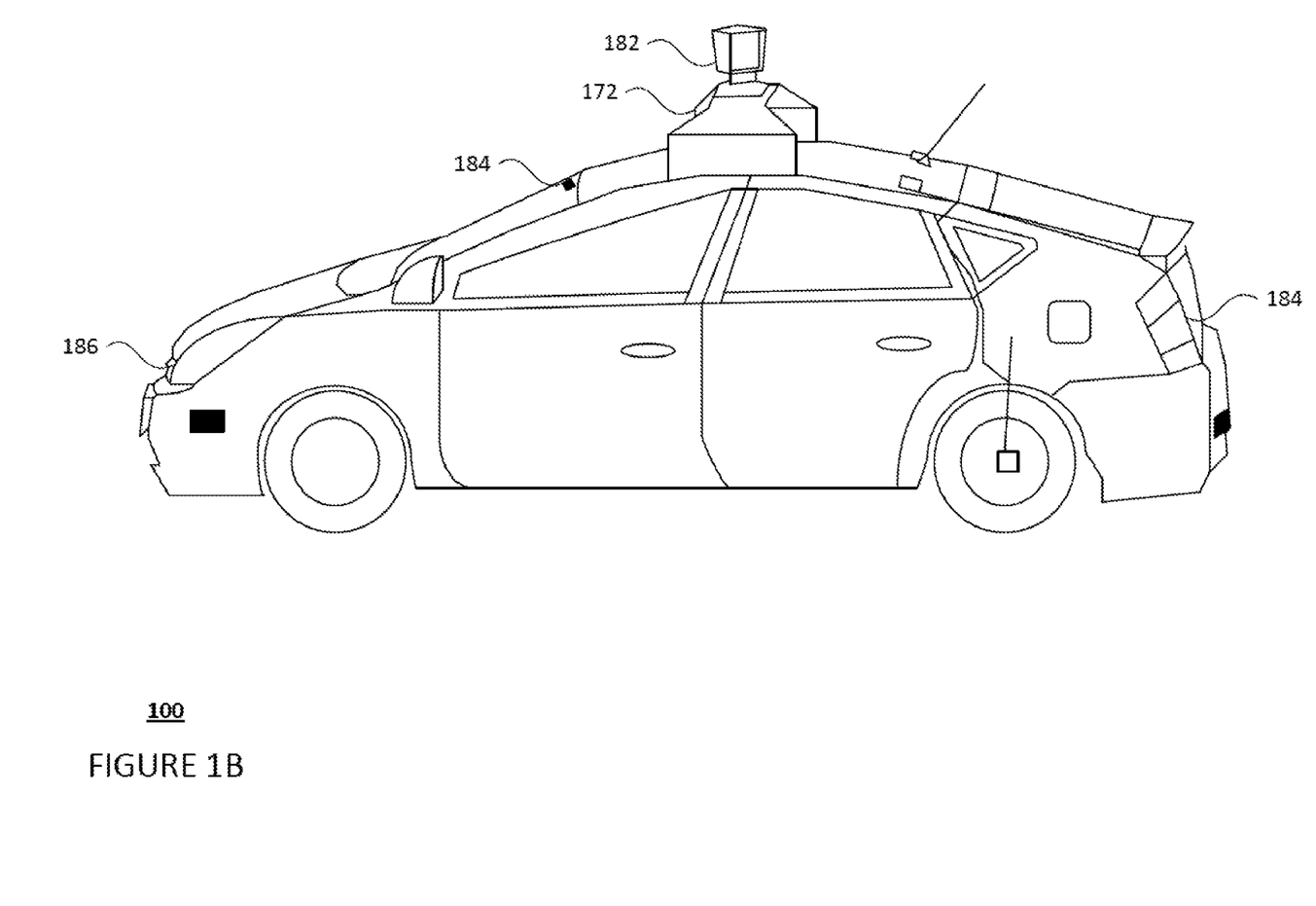
FIG. 1B is an example illustration of the vehicle of FIG. 1A in accordance with aspects of the disclosure.

FIG. 1B is an example illustration of vehicle 100 described above. As shown, various components of the detection system 172 may be positioned on the roof of vehicle 100 in order to better detect external objects while the vehicle is engaged. In this regard, one or more sensors, such as laser range finder 182 may be positioned or mounted to the roof of vehicle 101. Thus, the computing device 110 (not shown) may control laser range finder 182, e.g., by rotating it 180 degrees, or one or more cameras 184 mounted internally on the windshield of vehicle 100 to receive and analyze various images about the environment. Although the laser range finder 182 is positioned on top of detection system 172 in FIG. 1B, and the one or more cameras 184 mounted internally on the windshield, other detection devices, such as sonar, radar, GPS, etc., may also be positioned in a similar manner.

Figure 2:
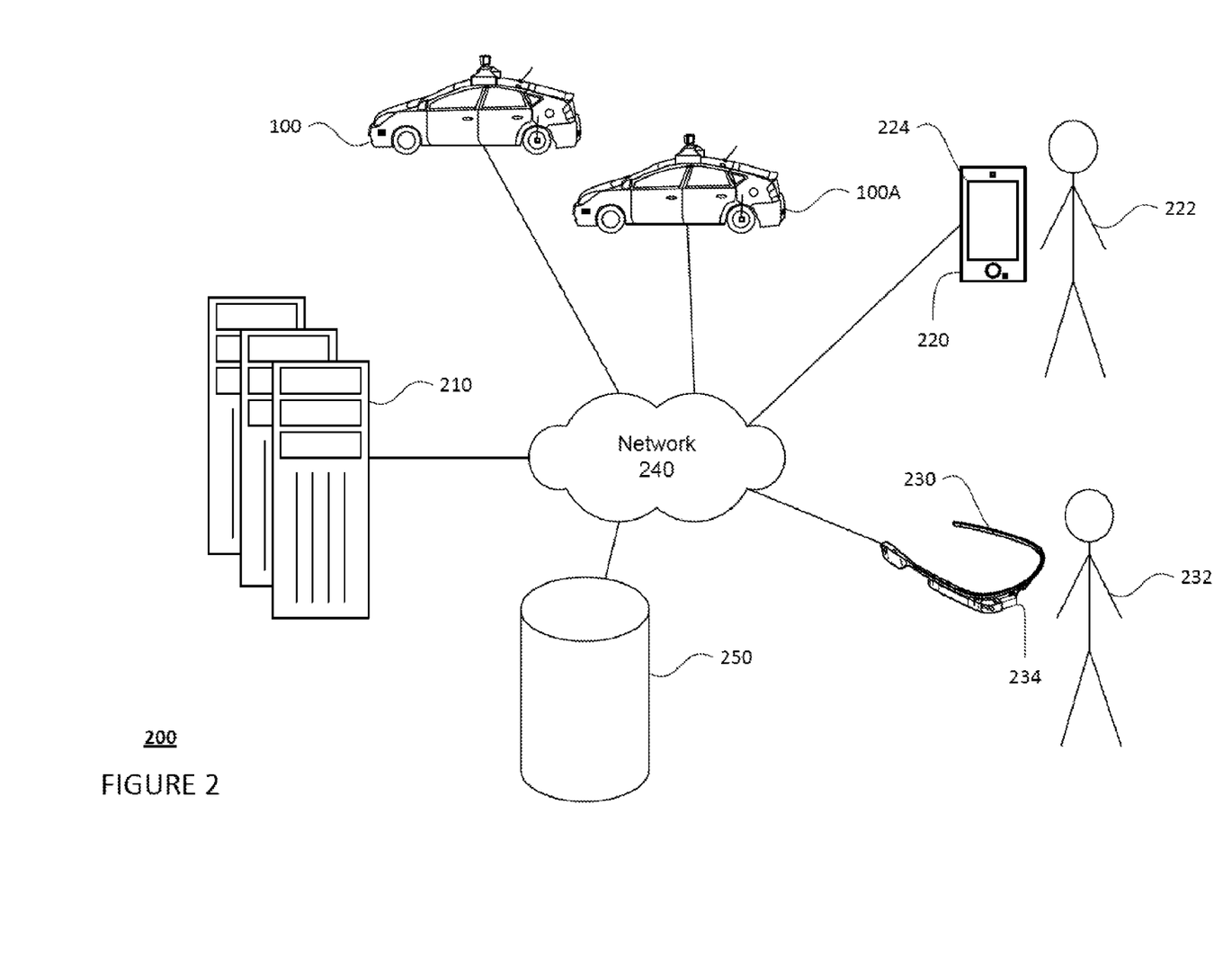
FIG. 2 is a pictorial diagram of an example system in accordance with aspects of the disclosure.
Figure 3:
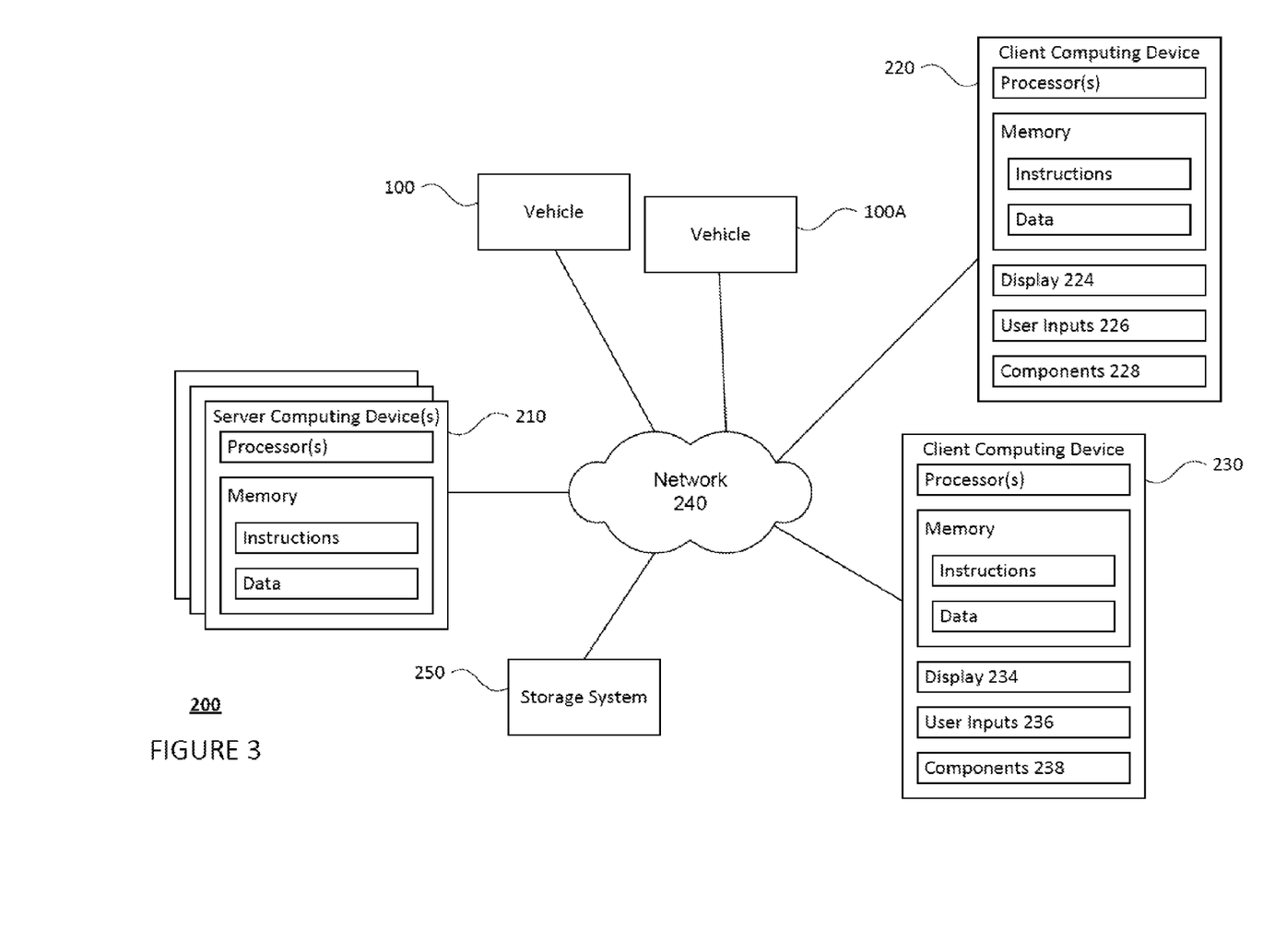
FIG. 3 is a functional diagram of the system of FIG. 2 in accordance with aspects of the disclosure.

Computing device 110 of vehicle 100 may also receive or transfer information to and from other computing devices. FIGS. 2 and 3 are pictorial and functional diagrams, respectively, of an example system 200 that includes a plurality of computing devices 210, 220, and 230 and a storage system 250 connected via a network 240. System 200 also includes vehicle 100, and vehicle 100A which may be configured similarly to vehicle 100. Although only a few vehicles and computing devices are depicted for simplicity, a typical system may include significantly more.

As shown in FIG. 3, each of computing devices 210, 220, and 230 may include one or more processors, memory, data and instructions. Such processors, memories, data and instructions may be configured similarly to one or more processors 120, memory 130, data 132, and instructions 134 of computing device 110 previously described with respect to FIG. 1A.

The network 240, and intervening nodes, may include various configurations and protocols including the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 110 may include a server having a plurality of computing devices, e.g., a load balanced server farm, that exchange information with different nodes of a network for the purpose of receiving, processing and transmitting the data to and from other computing devices. For instance, one or more computing devices may include one or more server computing devices 210 that are capable of communicating with computing device 110 (not shown) of vehicle 100 or a similar computing device of vehicle 100A as well as computing devices 220 and 230 via the network 240. For example, the locations of vehicles 100 and 100A may be monitored by one or more server computing devices, and various types of information, e.g., an incident on vehicle 100's route, may be relayed back and forth. And by maintaining constant communication between the one or more server computing devices 210 and vehicles 100 and 100A via network 240, the one or more server computing devices may also inform either vehicle if there are one or more users that have invoked privacy cloaks, as discussed in more detail below with regard to FIGS. 5 and 6.

In addition, the one or more server computing devices 210 may use network 240 to transmit and present information to a user, such as user 222, or 232 (depicted in FIG. 2), on a display, such as displays 224 or 234 of computing devices 220 or 230. In this regard, computing devices 220 and 230 may be considered client computing devices.

As shown in FIG. 3, each client computing device 220 or 230 may be a personal computing device intended for use by a user 222 or 232, and have all of the components normally used in connection with a personal computing device including a one or more processors (e.g., a central processing unit (CPU)), memory (e.g., RAM and internal hard drives) storing data and instructions, a display such as displays 224 and 234 (e.g., a monitor having a screen, a touch-screen, a projector, a television, or other device that is operable to display information), and user input devices 226 and 236 (e.g., a mouse, keyboard, touch-screen or microphone). The client computing devices may also include a camera for recording video streams, speakers, a network interface device, and all of the components used for connecting these elements to one another. In addition, the client computing devices may also include components 228 and 238 for determining the position and orientation of client computing devices 220 and 230. For example, these components may include a GPS receiver to determine the device's latitude, longitude and/or altitude as well as an accelerometer, gyroscope or another direction/speed detection device as described above with regard to positioning system 170 of vehicle 100.

Although the client computing devices 220 and 230 may each comprise a full-sized personal computing device, they may alternatively comprise mobile computing devices capable of wirelessly exchanging data with a server, e.g., the one or more server computing devices 210, over a network such as the Internet. By way of example only, client computing device 220 may be a mobile phone or a device such as a wireless-enabled PDA, a tablet PC, or a netbook that is capable of obtaining information via the Internet. In another example, client computing device 230 may be a head-mounted computing system. In yet another example, client computing device 230 may also be wearable, such as a computing bracelet, computing ring, computing watch, etc. As an example the user may input information using a small keyboard, a keypad, microphone, using visual signals with a camera, or a touch screen.

Storage system 150 may securely store various types of information as described in more detail below. This information may be retrieved or otherwise accessed by a server computing device, such as one or more server computing devices 210, in order to perform some or all of the features described herein. For example, the information may include user account information such as credentials (e.g., a user name and password) that can be used to identify a user to the one or more server computing devices. The user account information may also include personal information such as the user's name, contact information, identifying information of the user's client computing device (or devices if multiple devices are used with the same user account), as well as one or more unique signals for the user.

The storage system 250 may also store routing data for generating and evaluating routes between locations. For example, the routing information may be used to estimate how long it would take a vehicle at a first location to reach a second location. In this regard, the routing information may include map information, not necessarily as particular as the detailed map information described above, but including roads, as well as information about those road such as direction (one way, two way, etc.), orientation (north, south, etc.), speed limits, as well as traffic information identifying expected traffic conditions, etc.

As with memory 130, storage system 250 can be of any type of computerized storage capable of storing information accessible by the server computing devices 210, such as a hard-drive, memory card, ROM, RAM, DVD, CD-ROM, write-capable, and read-only memories. In addition, storage system 250 may include a distributed storage system where data is stored on a plurality of different storage devices which may be physically located at the same or different geographic locations. Storage system 150 may be connected to the computing devices via the network 240 as shown in FIG. 2 and/or may be directly connected to or incorporated into any of the computing devices 110, 210, 220, 230, etc.

In addition to the operations described above and illustrated in the figures, various operations will now be described. It should be understood that the following operations do not have to be performed in the precise order described below. Rather, various steps can be handled in a different order or simultaneously, and steps may also be added or omitted.

In one aspect, a user may download and install an application to cloak the user. For example, users 222 and 232 may download the application to their client computing devices 220 and 230, respectively. The client computing device may then transmit a request for the application over the network, for example, to one or more server computing devices 210, and in response, receive the application. The application may be installed locally at the client computing device.

As part of an initial set up of the application, the user may be prompted to create various credentials. For example, a user may select a username and password. In addition, the user may grant the application permission to send the location of the user's client computing device as needed.

Once the application is downloaded and installed, the user may use the application to sign-in and access a user account on the client computing device. After signing-in, the user may request, using the application interface, that his or her identity be cloaked or anonymized around the presence of autonomous vehicles that may be collecting image and sensor data near the user's location. As an example, a user such as user 232 may use the application on client computing device 230 to send location information to one or more server computing devices 210 so that the server computing devices 210 inform any nearby autonomous vehicles user 222's current location. In this regard, the autonomous vehicles may filter or otherwise format images that were received within a certain distance from user 222's current location.

Figure 4:
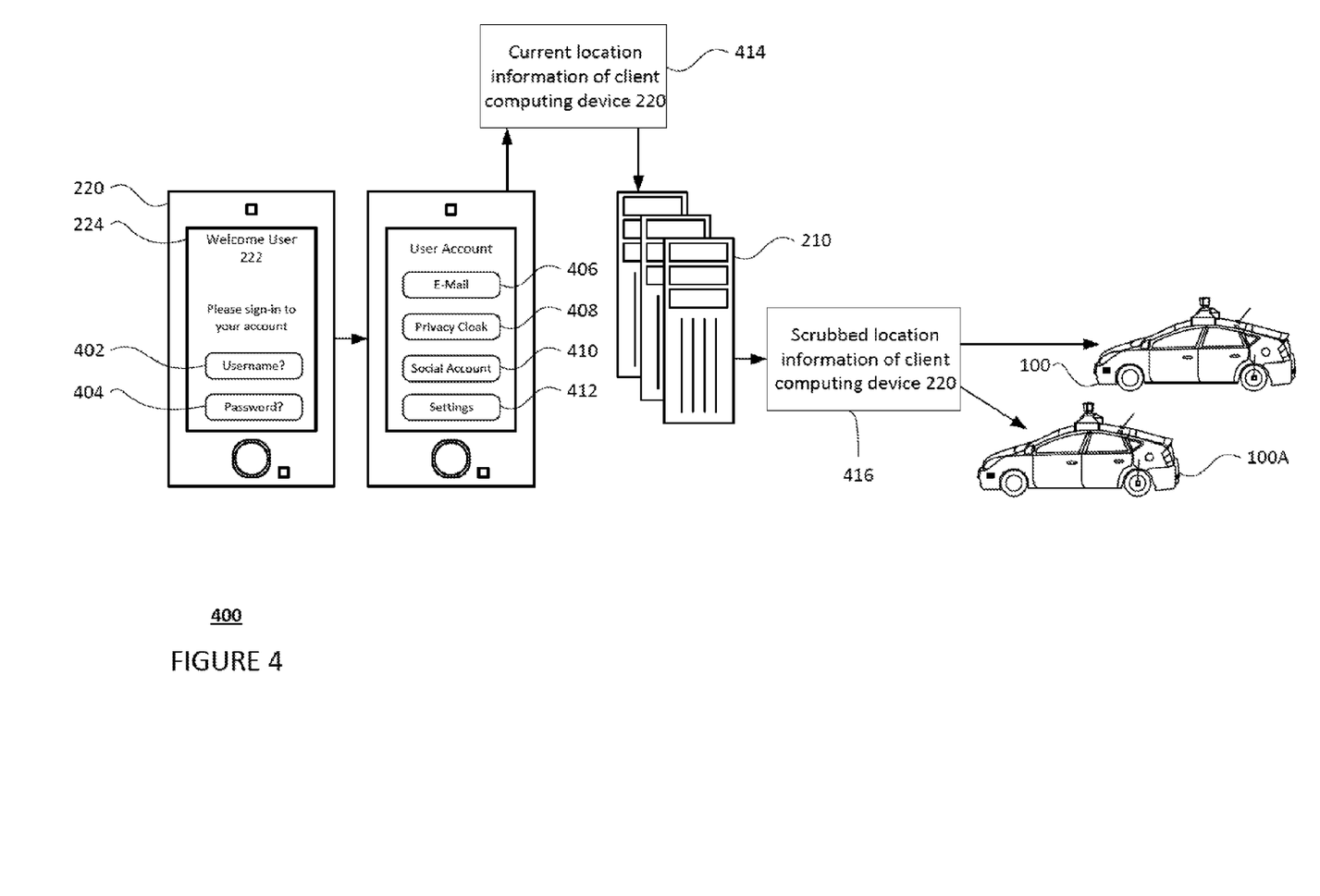
FIG. 4 is an example diagram of a client computing device sending location information to one or more server computing devices in accordance with aspects of the disclosure.

FIG. 4 is an example diagram 400 of a client computing device sending a request to one or more server computing devices in accordance with aspects of the disclosure. In this example, client computing device 220 may be running the application as described above. Client computing device 220, via display 224, provides a user, such as user 222, with an option to sign-in to the user's account by entering a username 402 and a password 404. After signing-in, client computing device 220 may display interface buttons associated with executable programs that the user 222 may select and open. One example set of the interface buttons displayed may include an e-mail button 406, a privacy cloak button 408, a social network account button 410, and a settings button 412, as shown. Here, user 222 may select the privacy cloak button 408.

Once a user selects a particular interface button, a client computing device executes an application associated with the selected button. For example, in response to user 222's selection of the privacy cloak icon 408, the client computing device 220 sends its current location information 414 to the one or more server computing devices 210, for example, via network 240. In this example, current location information 414 may include GPS location data and corresponding timestamps for the location data, such that the one or more server computing devices can discard not only old location data but also old scrubbed location data after a period of time to further protect the user's privacy. In addition, the current location information 414 may also include user information which can include or be used to identify the user's client device and/or credentials for authenticating the user, and information identifying the user's account information as described above.

Although not shown in the example of FIG. 4, in addition to the GPS location data that may be automatically sent to the one or more server computing devices, the current location information 414 may be inputted by the user. For example, user 222 may input into client computing device 220 that he or she is currently at the ABC Café near LMN Street and XYZ Avenue.

Before sending the current location information described above to a computing device of an autonomous vehicle, any information that may identify the user is scrubbed. As an example, in response to receiving the current location information 414 of client computing device 220, the one or more server computing devices 210 may scrub any information or data capable of identifying user 222 or client computing device 220 before sending location information of client computing device 220 to nearby autonomous vehicles. The one or more server computing devices 210 may use a scrubbing tool to remove, filter, amend, or otherwise anonymize any information related to user 222's identity.

Once all revealing information about a user's identity is filtered, one or more server computing devices may then send the user's location information to nearby vehicles. By way of example, after scrubbing the current location information 414 of anything capable of revealing user 222's identity, the one or more server computing devices 210 may then send the scrubbed location information 416 to vehicles that collect sensor data, such as autonomous vehicles vehicle 100, vehicle 100A, within a relevant area to the user's location, such as the same city, county, or state.

Figure 5:
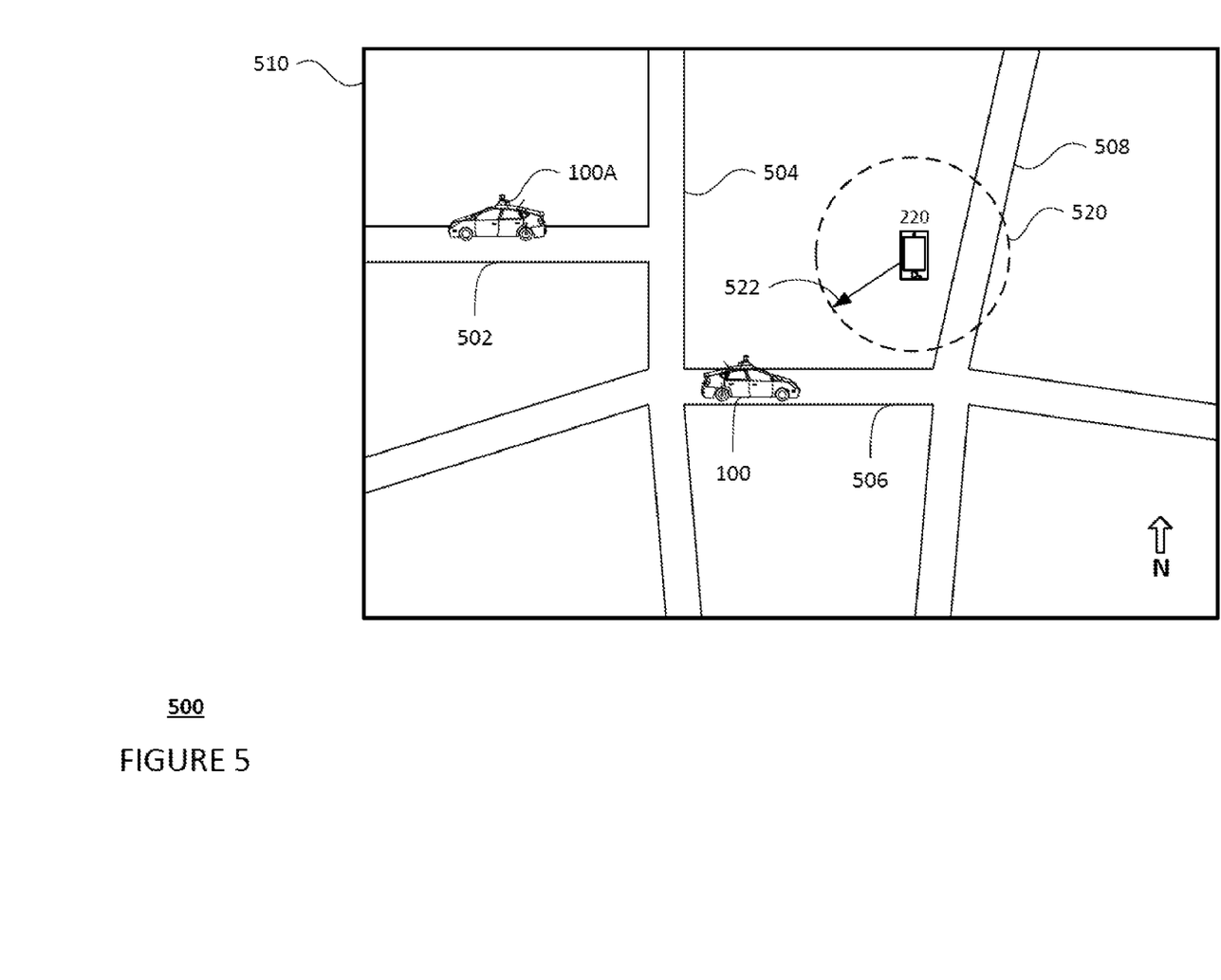
FIG. 5 is an example illustration of a map in accordance with aspects of the disclosure.

FIG. 5 is an example illustration 500 of a map 510. The one or more server computing devices may use the information depicted in this illustration to determine which autonomous vehicles may need to receive the scrubbed location information 416. This map information may be a part of the routing data of storage system 150. The map 510 includes a plurality of roads 502, 504, 506, and 508. The current locations of vehicles 100 and 100A, as reported to the one or more server computing devices by these vehicles, are depicted on map 510. In this example, vehicle 100 is moving eastbound on road 506 and vehicle 100A is moving westbound on road 502. Moreover, client computing device 220 (and presumably its user) is located on the west side of road 508. For example, this may be the location of ABC Café described above. As noted above, the user at this location may select the privacy cloak icon 408 on his or her client computing device 220. The client computing device 220, in turn, sends location information to the one or more server computing devices. Then, the one or more server computing devices examines whether the received location information contains any information that may identify the user or the client computing device 220. If any identification information is discovered, then the one or more server computing devices scrubs the information to remove anything that would identify the user or the client computing device 220 to vehicles 100 or 100A. Then, the one or more server computing devices may send the scrubbed location information of client computing device 220 to the computing devices of vehicles within a relevant area.

The relevant area may be broad, e.g., spanning an entire state, or may also be narrow, e.g., spanning only several blocks of a county. For instance, the relevant area of map 510 spans various portions of roads 502, 504, 506 and 508, and thus, includes vehicles 100 and 100A within the relevant area. In this regard, the one or more server computing devices may send the scrubbed location information of client computing device 220 to vehicles 100 and 100A. Moreover, the one or more server computing devices may also specify an area or boundary of a privacy cloak.

As shown in FIG. 5, cloak 520 establishes a threshold distance 522 from a location point originating from or near client computing device 220 to an edge of the cloak's boundary. In this example, threshold distance 522 is represented by a radius of the circular boundary of cloak 520. Alternatively, the boundary of cloak 520 may not be limited to a circular shape. It may be either symmetrical or asymmetrical in shape. In addition, determinations as to the size of cloak 520 may not be limited to the one or more server computing devices.

Figure 6:
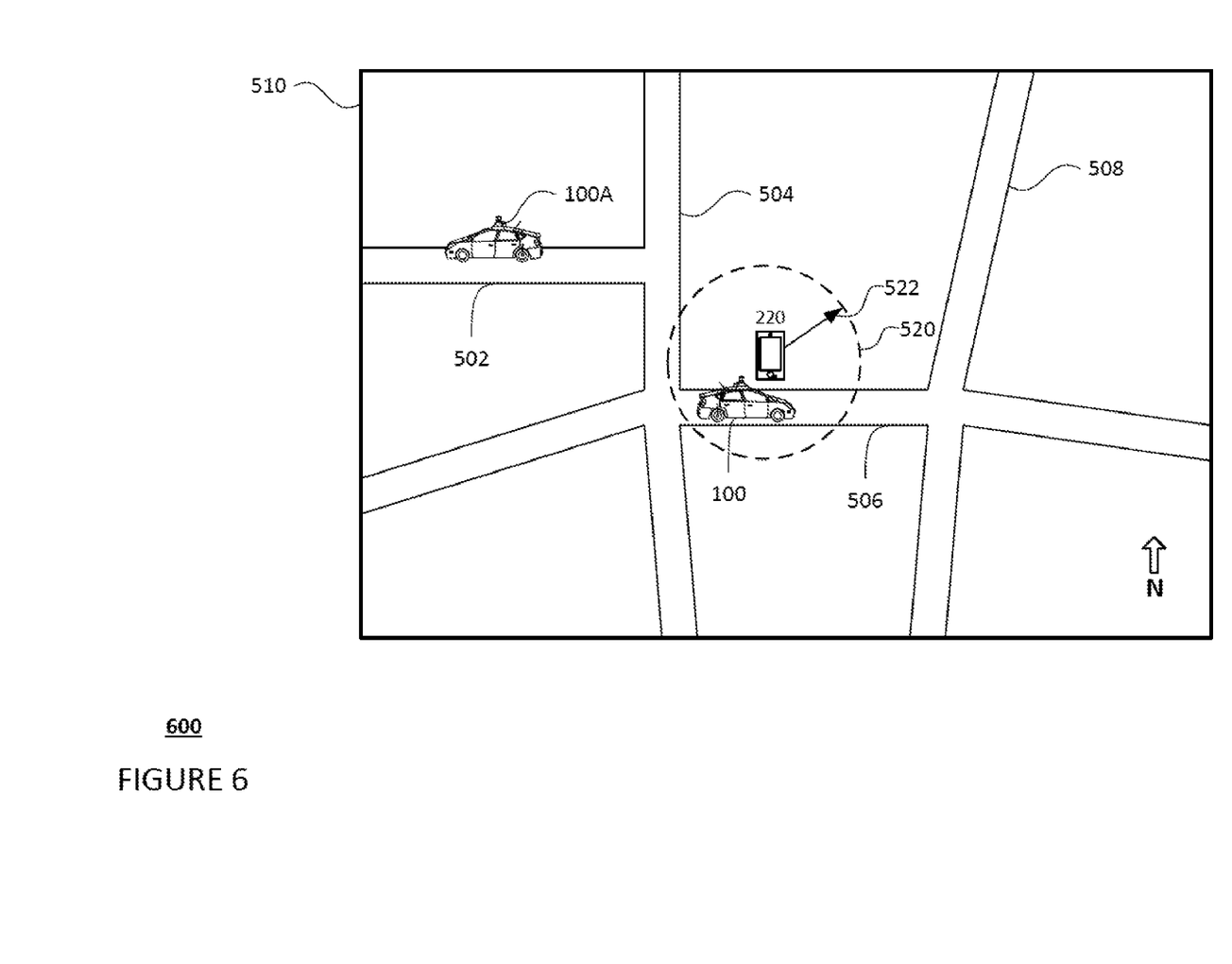
FIG. 6 is another illustration of the map of FIG. 5 in accordance with aspects of the disclosure.

As noted above, the vehicle's computing device uses the boundary of a privacy cloak to determine when the collected images and sensor data need to be filtered. FIG. 6 is an illustration 600 of map 510 depicting vehicle 100 entering the boundary of cloak 520. In this example, the client computing device is located on the north side of road 506. Vehicle 100 may be moving eastbound on the same road while computing device 110 is simultaneously gathering images and/or sensor data in order to control and operate vehicle 100. However, the collection of some of these images and/or sensor data may have occurred within the boundary of one or more privacy cloaks, such as cloak 520.

The captured sensor data may be used to control vehicle 100's various control systems (e.g., acceleration, deceleration, steering, signaling, positioning, etc.) and also may be stored in memory 130 of vehicle 100 for later processing. Before storing the acquired sensor data in memory 130 for later processing, however, computing device 110 may determine whether at least one of the images or other sensor data that were captured within one or more boundaries of cloaks in its path based on location information of one or more client computing devices. Based on this determination, computing device 110 may filter the images and/or sensor data acquired within the boundary of cloak 520. Accordingly, cloak 520 anonymizes any and all user identity associated with client computing device 220.

Figure 7:
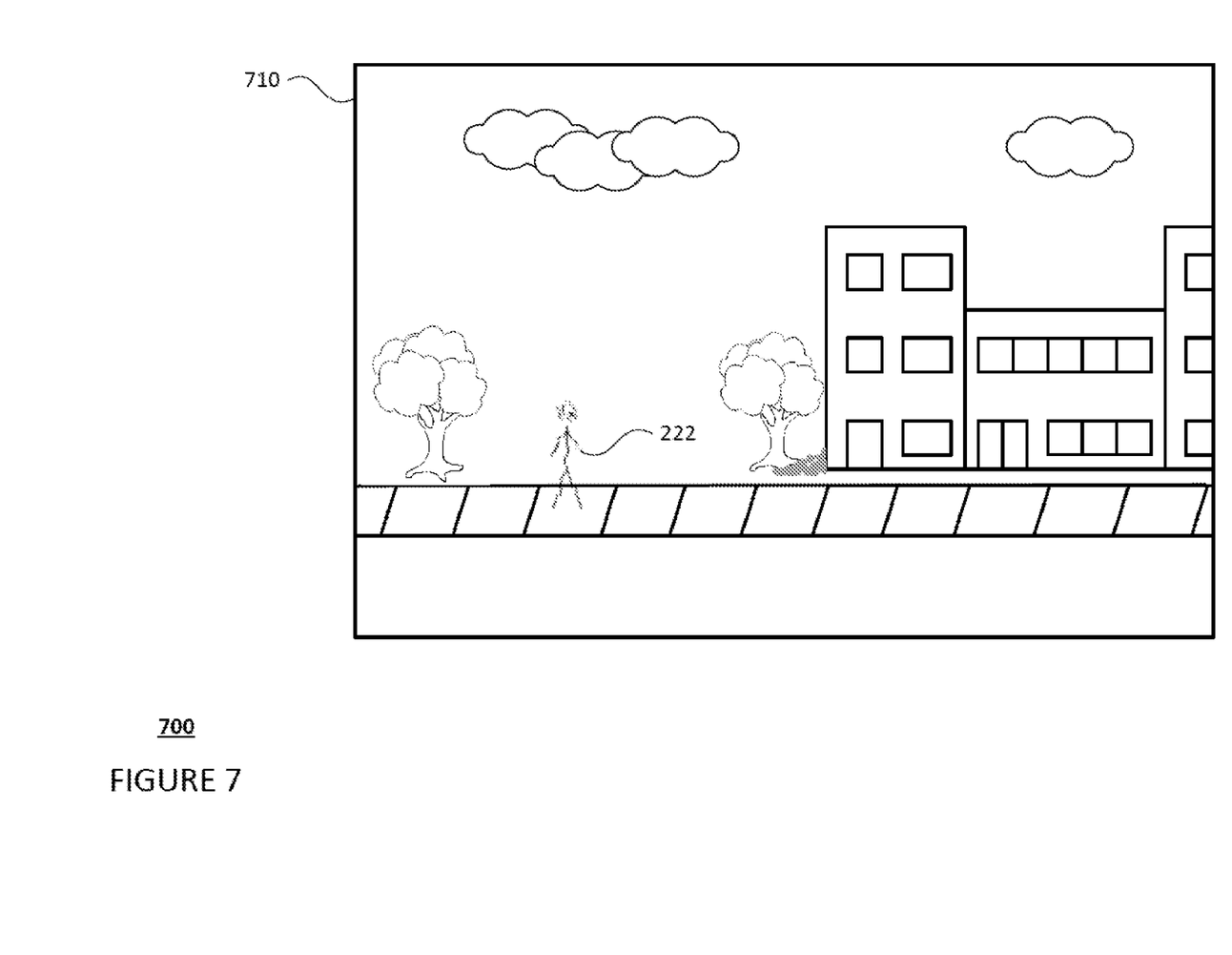
FIG. 7 is an example illustration of a blurred image in accordance with aspects of the disclosure.

The filtering process may include formatting, amending, distorting, blurring the relevant portions of the images and sensor data, or otherwise discarding the images or other sensor data in their entirety. In addition, the one or more server computing devices may undertake the filtering process after the captured sensor data is uploaded or downloaded. The one or more server computing devices may also discard previously stored scrubbed location data in one or more memory locations in order to further protect user privacy. FIG. 7 is an example illustration 700 of a blurred image in accordance with aspects of the disclosure. In one example, an image may have been acquired within the boundary of cloak 520 noted above and may depict user 222 standing near a building, e.g., ABC Café. Further, user 222 may have in his or her possession the cloak-activated client computing device 220 (not shown). After the filtering process, the image acquired within the boundary of cloak 520 may result in image 710. As shown, the pixels comprising the image of user 222 are distorted and blurred. The level of blurring or distortion may be maintained by the filtering process, and should be at least sufficient to render user 222 unrecognizable or unidentifiable.

Figure 8:
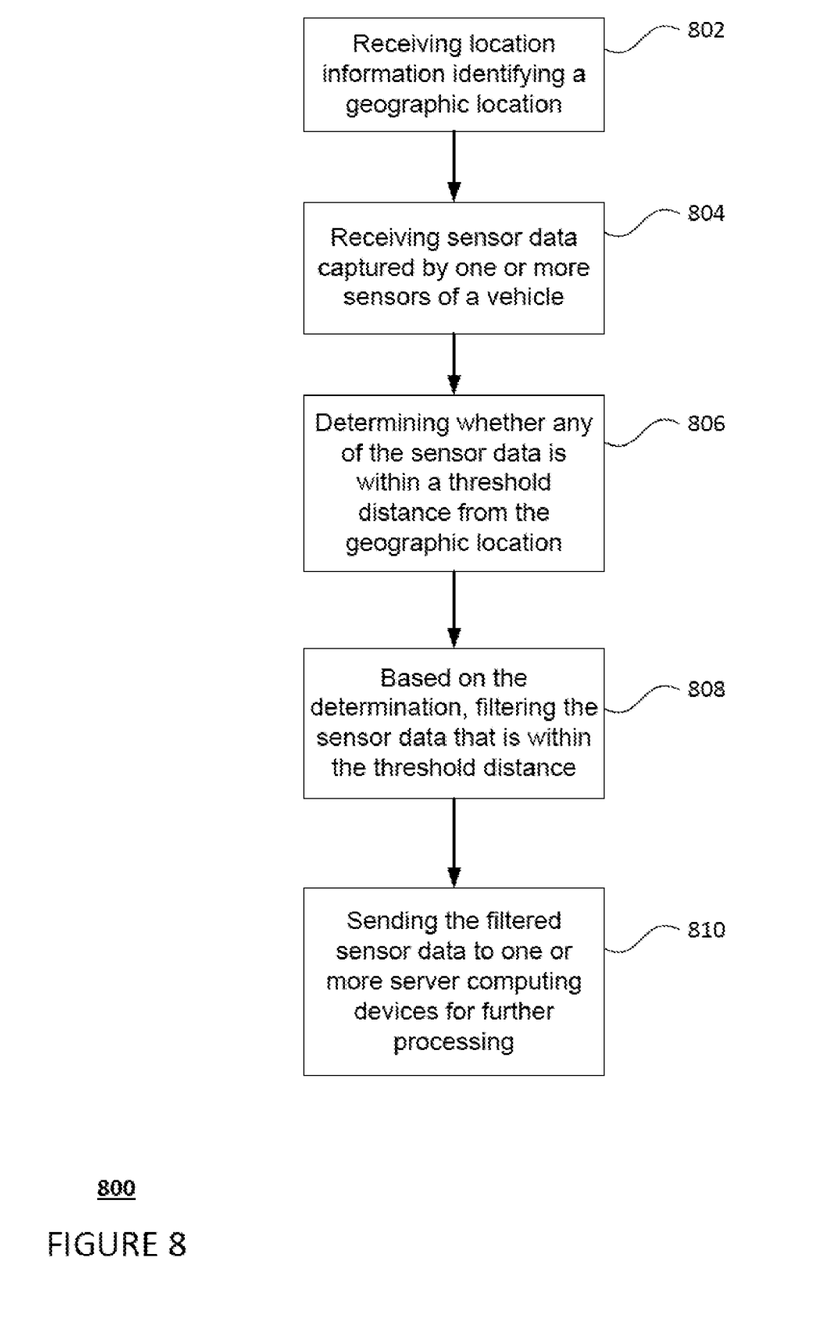
FIGS. 8 and 9 are flow diagrams in accordance with aspects of the disclosure.

FIG. 8 is a flow diagram 800 in accordance with aspects of the disclosure. By way of the example depicted in FIG. 1 only, computing device 110 of vehicle 100 may receive location information identifying a geographic location of client computing device 220 at block 802. As described above, location information may be in the form of GPS location data. At block 804, computing device 110 receives sensor data captured by one or more sensors of vehicle 100.

At block 806, computing device 110 determines whether the sensor data is within a threshold distance from the geographic location. Based on the determination made at block 806, computing device 110 filters the sensor data that is within the threshold distance. Then, at block 810, the computing device 110 sends the filtered sensor data to one or more server computing devices for further processing.

Figure 9:
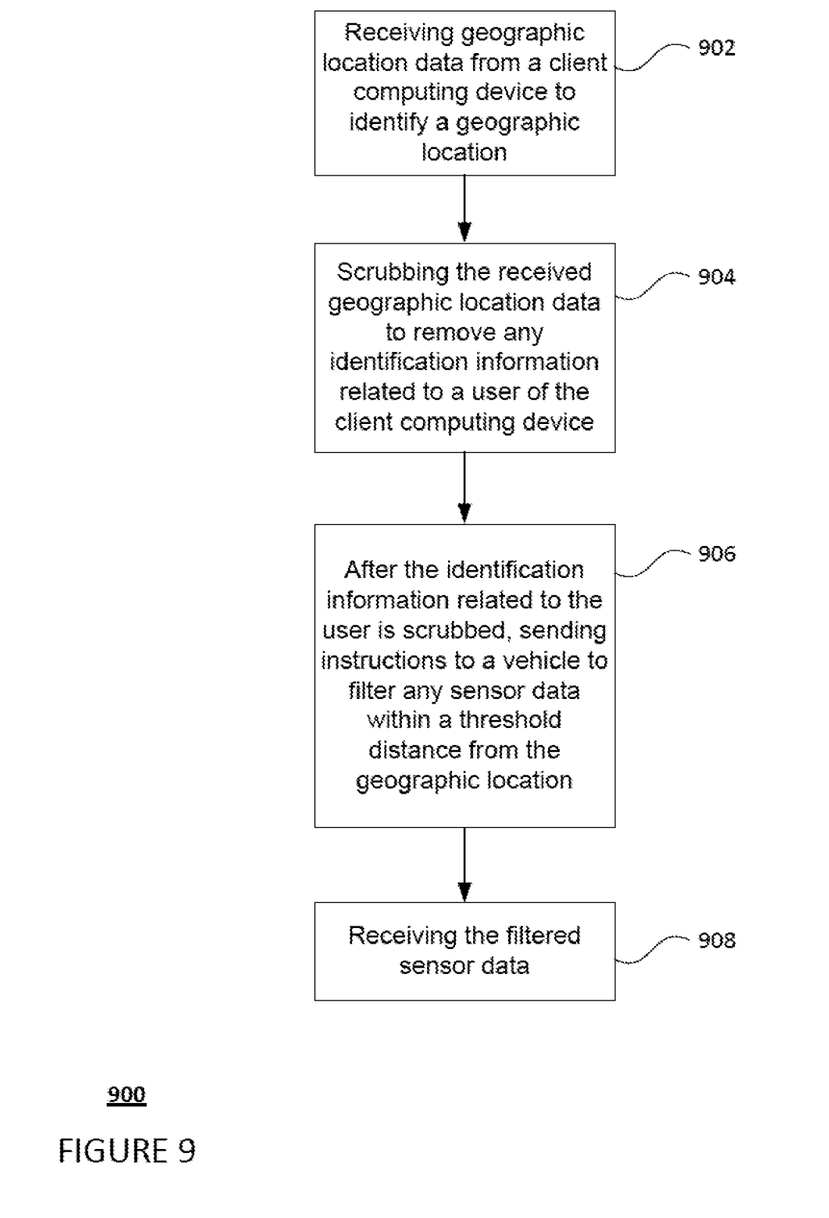

FIG. 9 is a flow diagram 900 in accordance with aspects of the disclosure. By way of the example depicted in FIG. 4 only, the one or more server computing devices 210 receive geographic location data from a client computing device to identify its geographic location at block 902. At block 904, the one or more server computing devices may scrub the received location data to remove any identification information related to a user of the client computing device, if found. Once any identification information related to the user is scrubbed, the one or more server computing devices sends instructions to a vehicle, e.g., vehicle 100 or vehicle 100A, to filter any sensor data within a threshold distance from the geographic location. At block 908, the one or more server computing devices receives the filtered sensor data from the vehicle(s).

The features described herein demonstrate that a user's privacy may be protected where vehicles may be gathering sensor data and/or images near the user's location. By allowing one or more server computing devices to receive geographical location information data from one or more client computing devices, scrub any information related to the user's identity, and instruct nearby vehicles to filter any data captured within a certain threshold distance from the user, the user's identity and privacy via his or her client computing device may be cloaked and thus protected. In addition, based on the timestamps of the received geographic location data and previously stored scrubbed data from the one or more client computing devices, the one or more server computing devices may remove or discard the data to further protect user privacy.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method comprising:
receiving from one or more remote server computing devices, by one or more computing devices of a vehicle, location information identifying a geographic location of a client computing device of a user without identifying the user;
receiving, by the one or more computing devices of the vehicle, sensor data captured by one or more sensors of the vehicle;
using, by the one or more computing devices of the vehicle, the sensor data to maneuver the vehicle in an autonomous driving mode;
identifying, by the one or more computing devices of the vehicle, a portion of the sensor data that was captured within a threshold radial distance of the geographic location of the client computing device of the user;
after using the sensor data, filtering, by the one or more computing devices of the vehicle, the sensor data to remove the portion of the sensor data that was captured within the threshold radial distance; and
sending the filtered sensor data to the one or more remote server computing devices for further processing.

2. The method of claim 1, further comprising, not storing the portion of the sensor data that was captured within the threshold radial distance in persistent storage of the one or more computing devices of the vehicle.

3. The method of claim 1, wherein the sensor data includes a plurality of images, and filtering the sensor data includes discarding at least one of the plurality of images that was captured within the threshold radial distance from the geographic location.

4. A system comprising:
memory;
one or more computing devices, each of the one or more computing devices having one or more processors, the one or more computing devices being coupled to the memory;
wherein the one or more computing devices are configured to:
receive from one or more remote server computing devices location information identifying a geographic location of a client computing device of a user without identifying the user;
receive sensor data captured by one or more sensors of a vehicle;
use the sensor data to maneuver the vehicle in an autonomous driving mode;
identify a portion of the sensor data that was captured within a threshold radial distance from the geographic location of the client computing device of the user;
after using the sensor data, filter the sensor data to remove the portion of the sensor data that was captured within the threshold radial distance; and
send the filtered sensor data to the one or more remote server computing devices for further processing.

5. The system of claim 4, further configured to not store the portion of the sensor data that was captured within the threshold radial distance in persistent storage of the memory.

6. The system of claim 4, wherein the sensor data includes a plurality of images, and filtering the sensor data includes discarding at least one of the plurality of images that was captured within the threshold radial distance from the geographic location.

7. The system of claim 4, further comprising the vehicle.

8. A method comprising:
receiving, by one or more computing devices of a server computing device, a cloaking request from a client computing device of a user, the cloaking request identifying a geographic location of the client computing device;
scrubbing, by the one or more computing devices of the server computing device, the geographic location to remove any identification information related to the user;
after scrubbing, sending, by the one or more computing devices of the server computing device, instructions to a remote vehicle to filter sensor data captured by the vehicle's sensors in order to remove any of the sensor data that was captured within a threshold radial distance from the scrubbed geographic location in accordance with the cloaking request; and
receiving, by the one or more computing devices of the server computing device, filtered sensor data.

9. The method of claim 8, further comprising storing the filtered sensor data in memory for further processing.

10. The method of claim 8, wherein the geographic location is associated with a corresponding timestamp, such that when a duration of time elapses relative to the timestamps, the one or more computing devices of the one or more server computing devices discards the scrubbed geographic location.

11. The method of claim 8, wherein the scrubbing includes at least one of removing, filtering, amending, and anonymizing the any identification information related to the user.

12. The method of claim 8, wherein the sensor data includes a plurality of images, and the instructions to filter include instructions to discard at least one image of the plurality of images that was captured within the threshold radial distance from the geographic location.

13. The system of claim 8, further comprising, prior to sending the instructions:
   identifying, by the one or more server computing devices, a relevant area based on the geographic location; and
   identifying, by the one or more server computing devices, a set of vehicles within the relevant area, wherein the set of vehicles includes the vehicle, and
   wherein sending the instructions is further based on the set of vehicles.

14. The system of claim 13, further comprising, sending, by the one or more computing devices, instructions to a second vehicle of the set of vehicles to filter second sensor data captured by the second vehicle's sensors in order to remove any of the second sensor data that was captured within a threshold radial distance from the geographic location.

15. The system of claim 8, wherein the instructions specify a value of the a threshold radial distance.

16. The method of claim 1, wherein the geographic location is received by the one or more computing devices of the vehicle as GPS location data.

17. The system of claim 4, wherein the one or more computing devices are further configured to receive the geographic location data as GPS location data.

18. The system of claim 8, wherein the one or more server computing devices are further configured to send the scrubbed geographic location data as GPS location data.

\* \* \* \* \*